March 17, 1931.   M. R. HULL   1,797,146
SUSPENSION SYSTEM FOR MOTOR VEHICLE BODIES AND THE LIKE
Filed May 8, 1930   5 Sheets-Sheet 1
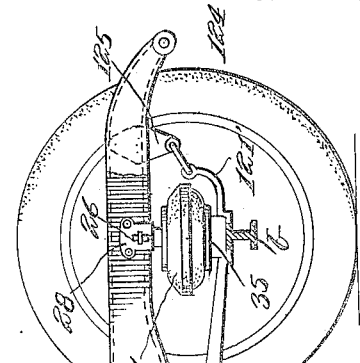
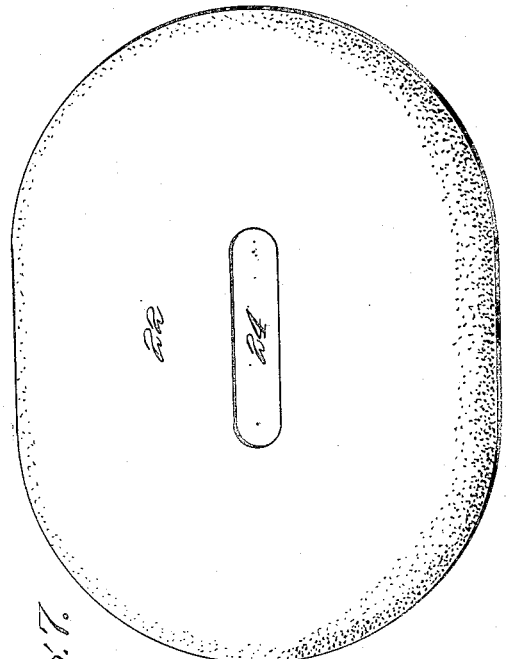
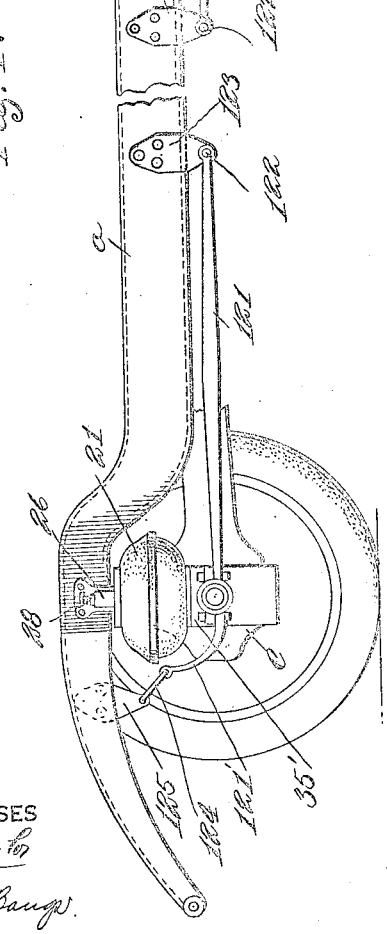
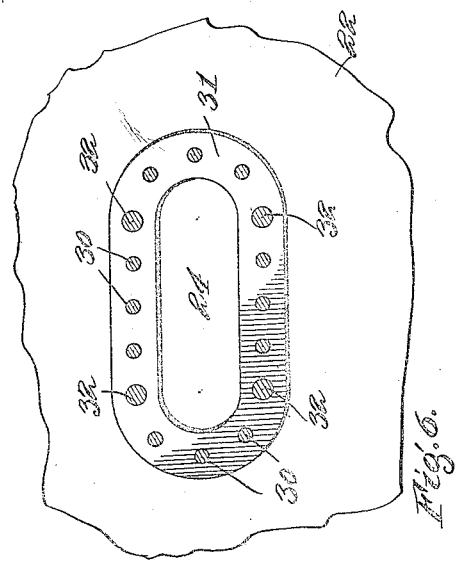
INVENTOR
Monroe R. Hull
BY
ATTORNEY

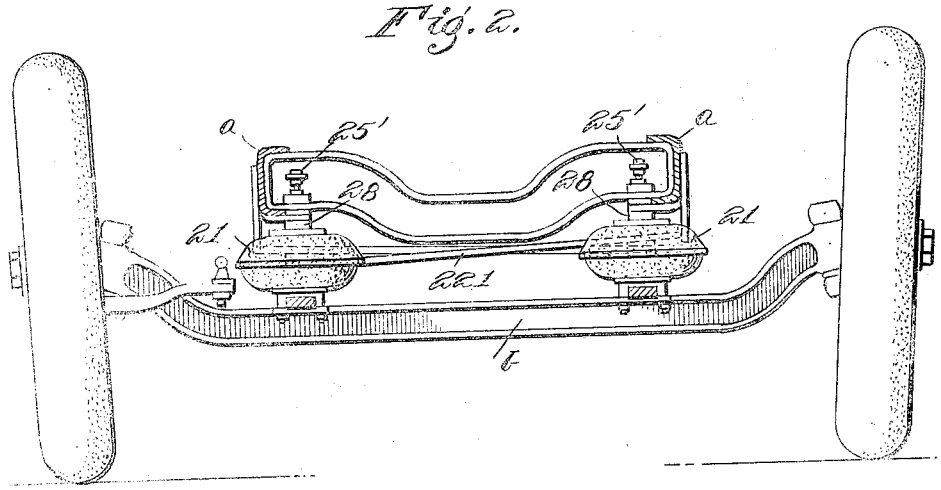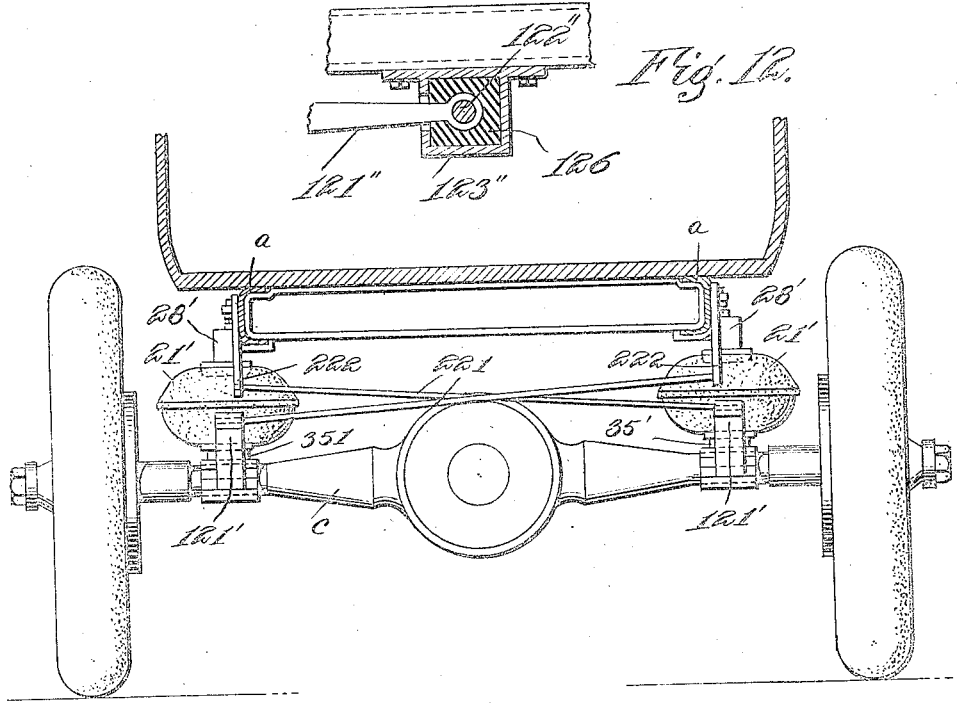

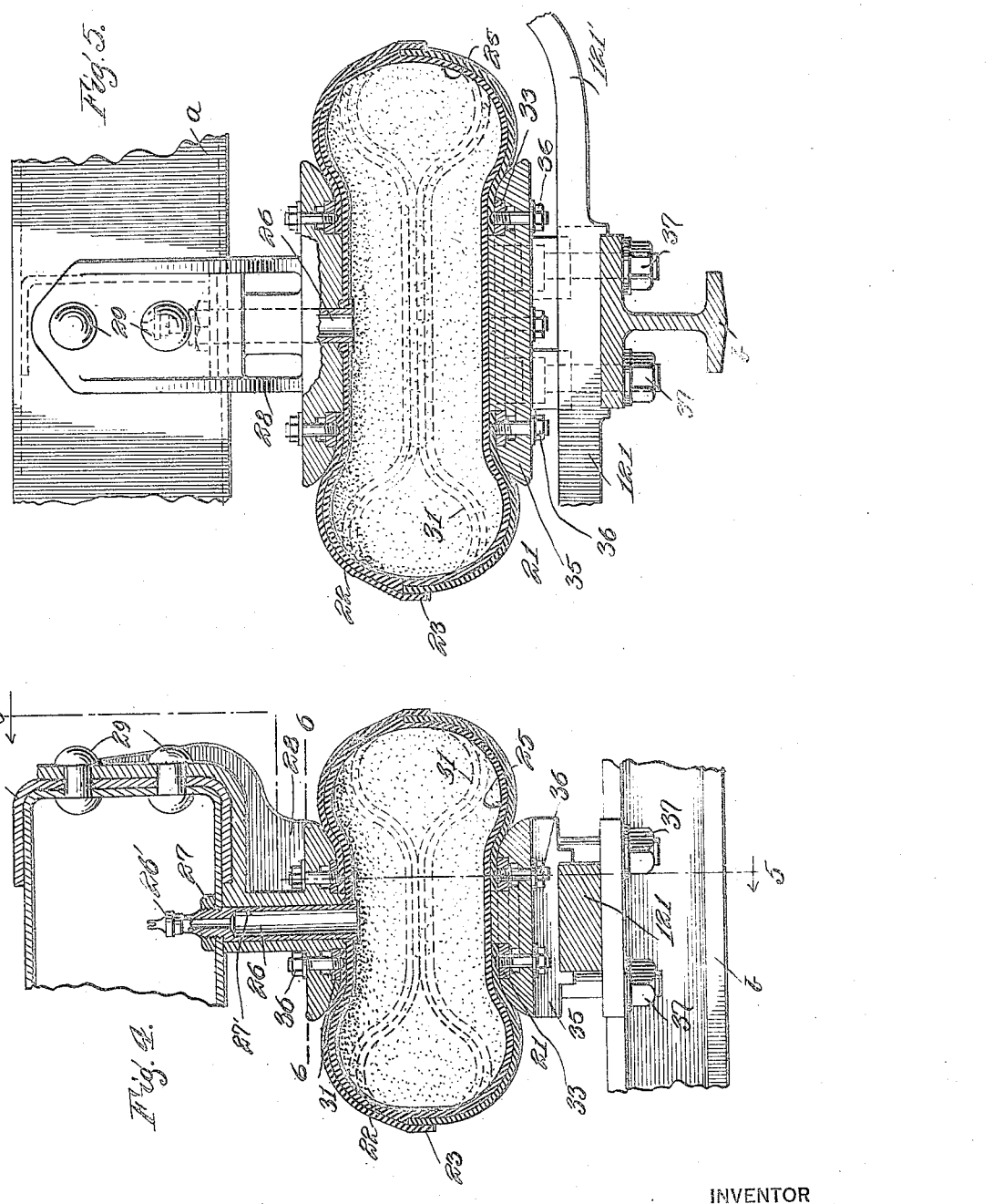

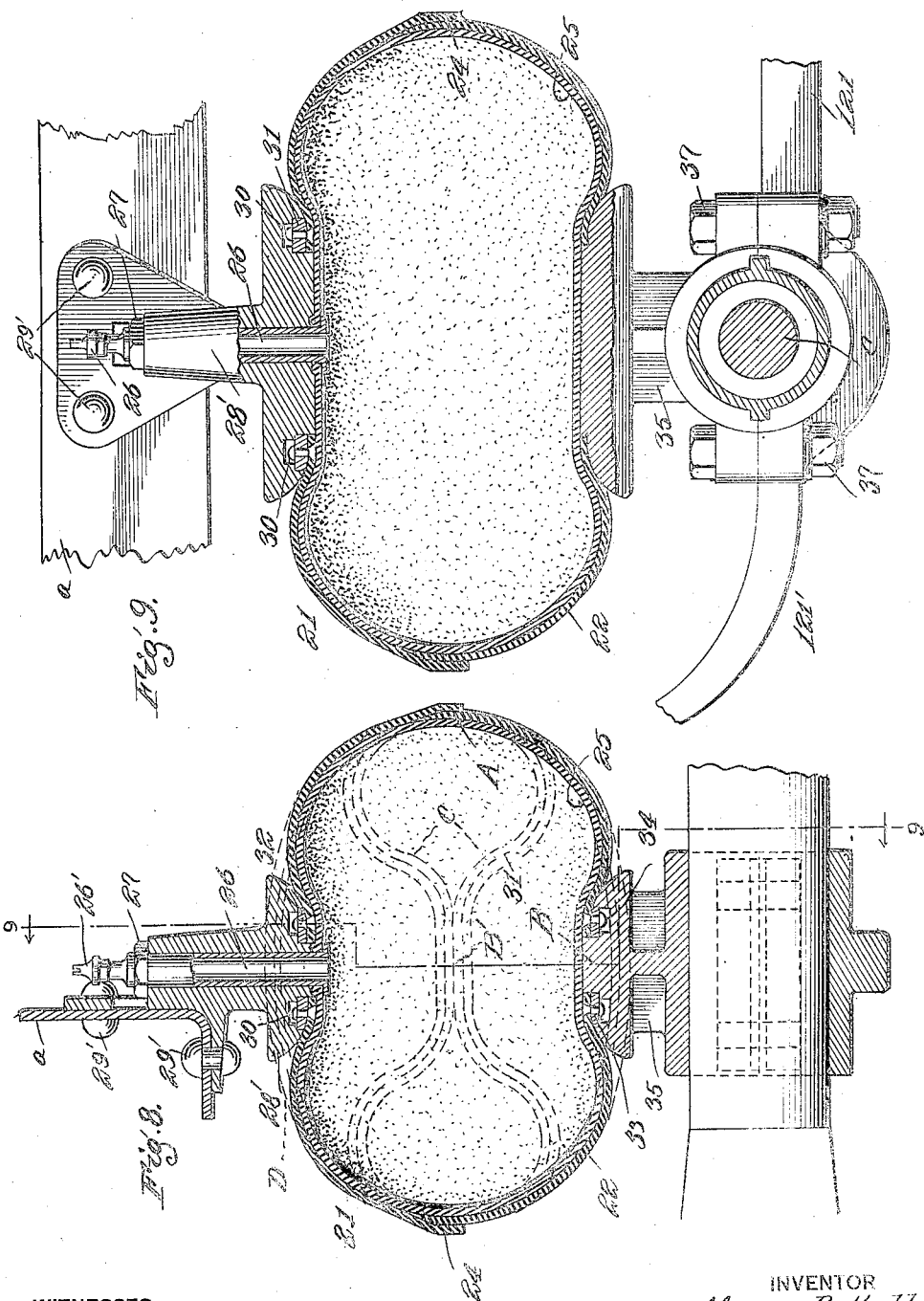

March 17, 1931. M. R. HULL 1,797,146
SUSPENSION SYSTEM FOR MOTOR VEHICLE BODIES AND THE LIKE
Filed May 8, 1930 5 Sheets-Sheet 5
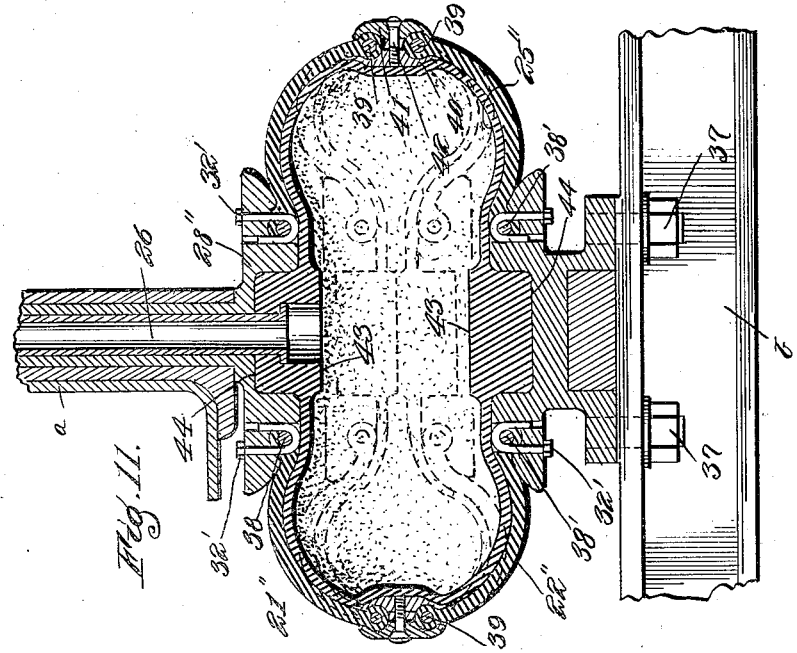
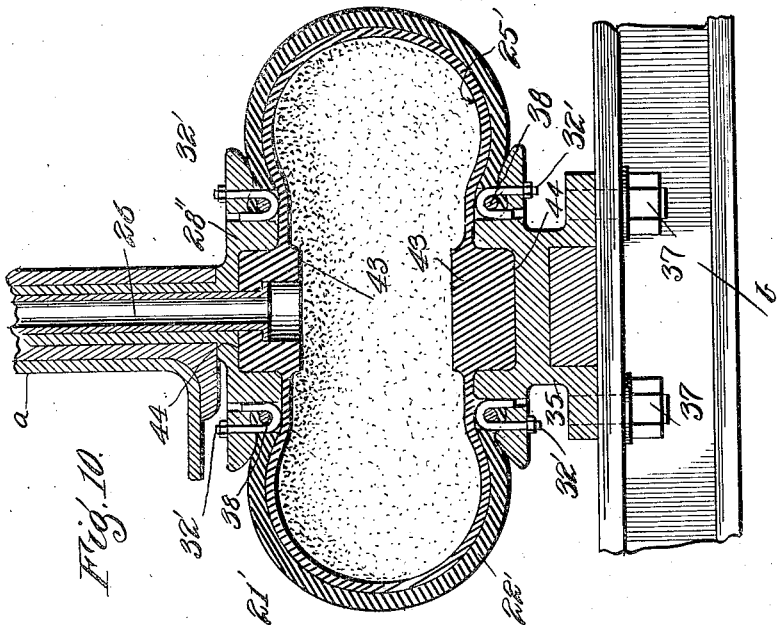
WITNESSES
INVENTOR
Monroe R. Hull.
BY
ATTORNEY Patented Mar. 17, 1931

1,797,146

UNITED STATES PATENT OFFICE

MONROE R. HULL, OF ANACONDA, MONTANA

SUSPENSION SYSTEM FOR MOTOR-VEHICLE BODIES AND THE LIKE

Application filed May 8, 1930. Serial No. 450,807.

This invention appertains to improvements in suspension systems for the bodies of motor vehicles and the like generally, and more particularly to types of the same designed to protect the bodies and their occupants against shocks and jars due to irregularities in roadways or the ground surface.

An object of this invention is to provide better means for the suspension of bodies of motor vehicles than those now known and/or in use and whereby but little of the irregular motion of the chassis or running gear of a vehicle will be transmitted to the body or its occupants.

Another object of the invention is to provide suspension means of the pneumatic type which are simple in design, durable in construction and use and highly efficient in operation.

A further object of the invention resides in the provision of effective and efficient body centering devices which function to protect the pneumatic suspension or cushioning means from stresses arising from forces tending to cause relative transverse motion between the axles and the frame or body of the vehicle.

Still another object of the invention is to provide front and rear torque means to functionally supplement the body centering devices aforesaid in relieving the pneumatic suspension or cushioning means from stresses arising from forces tending to cause relative longitudinal motion between the front and rear axle assemblies and the frame or body of the vehicle.

A still further object of the invention is to provide a means for mounting the pneumatic suspension means between the chassis or the axles carried thereby and the body or body supporting frame of the vehicle, whereby to relieve the pneumatic suspension means of any of the usual and otherwise injurious or destructive strains and stresses incident to the relative movements of the vehicle body with respect to the chassis or running gear of the vehicle during the operative movements of the latter.

A most important object and advantage of the present invention lies in the elimination of all or nearly all of the many points ordinarily requiring lubrication in steel spring suspensions, such as will effect an appreciable saving in time, labor and expense in the upkeep of the average operation of a motor vehicle.

Another object of the invention is to provide a pneumatic suspension system with a combination of parts in which the function or functions of each will be so simplified as to insure greater safety than is obtainable with any suspension system now in use.

In order to fully differentiate the objects and advantages of the present invention over other types of vehicle body suspensions and the like, emphasis is to be laid on the fact that steel springs and their appurtenance, as used for the suspension of the bodies of motor vehicles, have many objectionable features, some of which are:—That it is practically impossible to permanently prevent annoying squeaks and rattles, that they quickly become unsightly from the accumulations of oil and dust, that many serious accidents have been caused by the breaking of steel springs; that spring performance varies with the degree of lubrication and that the springs as ordinarily constructed cannot be adjusted to properly suspend varying loads.

The various function of steel springs, especially in automobile vehicles in which the driving force is carried by the springs from the driving axle housing through the frame, are so complex that they cannot be made to perform efficiently all of these functions, which are as follows:—The suspension of the vehicle body so as to protect it and its occupants from shocks; to maintain correct relations longitudinally and transversely between the body and the chassis of the vehicle; to prevent rotation of the front axle and to prevent rotation of the rear axle housing and to transmit the driving thrust from it to the frame.

The suspension system herein specified will either eliminate or minimize all of these objectionable features of steel spring suspension.

With the foregoing and other equally important objects and advantages in view, the invention resides in the certain new and useful combinations, constructions and arrangements of parts as will be hereinafter more fully described, set forth in the appended claims and illustrated in the accompanying drawings, in which:

Figure 1 is a side elevation, partly in section of a conventional form of motor vehicle chassis or running gear, showing a practical application of the invention, in its entirety, thereto;

Figure 2 is a vertical transverse section, showing the front axle assembly and its associated body suspension and centering devices in elevation;

Figure 3 is a view similar to that of Figure 2, but showing the rear axle assembly and its associated body suspension and centering devices in elevation;

Figure 4 is a vertical transverse section of one of the pneumatic suspension devices and its supporting means, showing the same as applied to the front axle of the vehicle;

Figure 5 is a vertical longitudinal section, taken approximately on the line 5—5 of Figure 4;

Figure 6 is a horizontal section, taken approximately on the line 6—6 of Figure 4;

Figure 7 is a top plan view of one of the casings of a pneumatic suspension device in accordance with the present invention;

Figure 8 is a view similar to that of Figure 4, but showing a form of the pneumatic suspension device and its mounting as applied to a rear axle structure;

Figure 9 is a vertical longitudinal section, taken approximately on the line 9—9 of Figure 8;

Figure 10 is a vertical transverse section through another modified form of pneumatic cushion structure, which in plan view would be circular;

Figure 11 is a view similar to that of Figure 10, but showing still another modified form of the pneumatic cushion structure; and Figure 12 is a fragmentary side elevation of one of the chassis side frames, showing an alternate form of shock absorbing connection between the adjacent end of a torque member or arm and the side frame.

Referring to the drawings, wherein like characters of reference designate corresponding parts throughout the several views thereof, and more particularly to Figures 1 to 3 inclusive, the embodiment of the invention, as shown therein by way of example only, is generally constituted in a plurality of pneumatic cushions 21 interposed between the body or side frame $a$ and the axle or axle housings $b$ and $c$ of a motor vehicle; a plurality of torque members or arms 121 rigidly connected to the axles or axle housings $b$ and $c$ and pivotally connected to the body or side frame $a$ of the motor vehicle; and a plurality of centering devices 221 consisting of transverse members or cables, each connected at one end to an extension 121' of one of the torque members or arms 121 or to an axle or axle housing $b$ or $c$ and at its other end to the body or side frame $a$ of the vehicle.

In Figures 4 and 5, the pneumatic suspension devices or cushions 21 therein shown are particularly designed for use in suspending the body or side frames $a$ from the front axle $b$, while those in Figures 8 and 9 are especially designed for use on the rear axle or axle housing $c$. The casings may be made of a combination of rubber and fabric or leather, or any other suitable flexible strong material and an inner tube or cushion 25 of rubber stock similar to that employed in the manufacture of inner tubes for pneumatic tires.

In the form of the invention, as depicted in Figures 4 to 7, inclusive, the casings 22 are preferably oblong in form while the cushions or tubes 24 are of similar formation. However, both the casings 22 and the fillers or tubes 24 may be made circular in plan if desired. Also, the casings are preferably made in two horizontal split sections which may in assembly, have their adjacent side edges overlapped, as at 23, and subsequently vulcanized or they may have the edges otherwise formed and secured together by any other suitable means. An inflating tube 26 is seated in the upper wall of a cushion or inner tube 25 at the center thereof and is projected outwardly of the upper casing part through an elongated opening or slot 25 formed in the latter for the purpose. This elongated opening or slot 24 also serves for the insertion of a cushion or tube into place therein or its removal therefrom. The outer end of this inflation tube 26 is provided with the usual capped and valved inlet portion 26' which is projected upwardly through an opening formed in a chassis cross bar extending between the side frames $a$ and screw threaded to receive thereon a clamp nut 27.

A bracket 28 is held by rivets 29 to a side frame $a$ and to the cross bar aforesaid extending between the oppositely disposed side bars. This cross bar, however, may or may not be necessary, since the inflation tube 26 is passed upwardly through a bore 27' in the bracket 28 and, in the absence of the cross bar aforesaid the clamp nut 27 would be tightened up directly against the adjacent sides of the bracket.

Secured to the outer side of the upper portion of the casing 22 and about the opening or slot 24 therein by means of rivets or the like 30 is a retainer member 31 of metal which seats in a recess formed in the lower flanged side of the bracket 28 and is secured in place therein by suitable fastenings or studs 32.

Similarly, a second retainer 33 is secured by rivets or the like 34 to the lower side of the bottom casing part in line with the first of the retainers 31 at the upper side thereof and is secured in a recess formed in the upper side of a lower bracket 35 by means of fastenings or studs 36. This lower bracket 35 is, in turn, secured to the front axle $b$ by means of bolts or the like 37.

It is to be noted that the inner tubes or inflation cushions 25 as illustrated in Figures 4, 5, 8 and 9, each having a bead extending about the opening therein, in which the inflation tube 26 is seated and the same is to be forcibly held in a groove in the lower extremity of an upper bracket 28 by the flange at the lower engaged end of the inflation tube. This construction is to insure an air tight joint between the inner tube and the bracket.

Referring now to Figures 8 and 9, it is to be noted that the upper bracket 28' is here secured, by means of the rivets 29', to the body or side frame $a$, in which case the inflation tube 26' will be secured in the offset portion of the bracket by means of the clamp nut 27' which distinguishes from the arrangement of these brackets, as shown in Figures 4 and 5, in reversed position beneath the body of the side frames $a$ and the securing of the same to both the latter and the cross bar passing beneath the body or between the oppositely disposed side frames.

In the modified form of the cushion structure and its securement as shown in Figure 10, wire rings 38 are employed in lieu of the retainers 31, and the same are built into the upper and lower sides of the casings 22' about openings or slots therein, in any suitable or usual manner and the same are engaged by the hook end portions of a multiplicity of fastenings or bolts 32' secured in the opposed enlarged ends of the brackets 28'' and 35''. In this instance the casing 22' is preferably made in one piece and after the manner of the casing of a pneumatic tire, both it and the filler or cushion 25' may be made circular in plan. The opposed surfaces of the enlarged portions of the brackets 28' and 35' are recessed in order that the ring reinforced portions of the casing will be secured in place therein when the bolts 32' are tightened up.

As shown in Figure 11, a two-part casing 22'' may be employed with the type of fastenings and mountings used in the form of the invention depicted in Figure 10, in which case, the adjacent edge portions of the parts will preferably be reinforced with metal rings 39 embedded in the same and thereafter joined together by means of a clamp formed of an inner ring member 40 and an outer split ring member 41 secured in clamping relation by means of screws or the like 42.

In these last two forms of cushion structures 21' and 21'', the inner cushion 25' and 25'' thereof respectively, are each formed to provide outwardly offset thickened portions 43 and 44 at the centers of the upper and lower sides thereof, which seat in recesses formed in the brackets 28' and 35' respectively for their reception. The upper thickened portion 43 is provided with a bore through the same for the projection outwardly therethrough of the inflation tube 26''. The bore, at the inner side of the thickened portion 43 is of an enlarged diameter to form a seat for the inner flanged end of the inflation tube 26'' substantially as shown.

These portions 43 and 44 act as bumpers or additional shock absorbing cushions, whenever the pneumatic cushion is fully deflected or depressed under load or road shock, as will be evident from the position of the parts as shown in broken lines in Figure 11.

In Figure 4, the full lines show casings 21 and 22 and the inner tube 25 approximately as they would appear when properly inflated with the car at rest or running on a smooth road. The broken lines 31 show the approximate shape of the cushion when fully deflected as when a wheel strikes a big bump and the broken lines 32 show the approximate shape of the cushion when fully extended as when on the rebound. In the latter case, the casing will act in tension and limit the rebound.

In the pneumatic cushions as thus severally constructed and arranged, their compression or deflection is substantially in proportion to their load and this result is accomplished by the following procedure.

First, a determination of the initial effective area of a cushion for supporting a given load is obtained with the motor vehicle at rest; second, a determination of the air pressure required on this predetermined area to carry the load, is then ascertained; third, the initial volume of air, contained in the cushion after these prior determinations are made is then computed; fourth, the final volume of air contained in the cushion when fully compressed or deflected under load as shown in broken lines in Figures 4 and 5, is thereafter calculated; fifth, a determination of the effective area of a cushion, in supporting the load in compressed or deflated state is then made; and sixth, the absolute pressure of air in the cushion when fully compressed or deflected under load is now to be obtained by multiplying the initial absolute air pressure by the ratio of the initial volume of air to the final volume thereof.

By designing the cushions in accordance with these determinations, computations and calculations and to the particular forms of the same as illustrated, the perimeters of the casings thereof remain practically constant in length, as shown in the several vertical cross sections thereof, for the various degrees of compression or deflection, with no sharp bends or other unevenness being created therein. This construction is to avoid stretching of the casings which would destroy them. Reference to Figure 8 will show the distance from A to B when measured along the casing as shown in the full line is almost exactly the same as the distance from A to B' when measured along the casing as shown in broken lines 31 when fully deflected. It is also to be noted that the portions of the brackets 28 and 35 opposed to each other and to the adjacent walls of the casing are rounded off at their edges in directions outwardly from the adjacent sides of the latter, in order that only smooth even surfaces will be presented to the latter and all possibility of the formation of otherwise injurious or destructive bends in the perimeters of the casings will be avoided and this, regardless of the amount of compression or deflection imparted thereto.

Further reference to Figures 4 and 5 will show that the surfaces of the brackets 28 and 35, that come in contact with the casing 22 are smaller than the area of the casing as it would appear if viewed in plan as shown in Figure 7, and the form of the cushion, when fully deflected as shown in broken lines in Figures 4 and 5 is such that the pressure of the confined air is definitely limited and mathematically predeterminable and safely below the pressure that could cause rupture of the casing.

As has been heretofore suggested, the invention contemplates the employment of front and rear longitudinally disposed torque members or arms 121 (Figures 1 to 3 inclusive) and front and rear transversely disposed body centering members or cables 221 in conjunction with the pneumatic suspension devices aforesaid and each of the former at the opposite sides of the front end of the vehicle has its rearwardly directed end pivoted, as at 122 to a bracket 123 depending from an intermediate point along one side of the body or side frame $a$ and its front end engaged in the complemental of the lower cushion supporting brackets 36 and secured to the same and the axle $b$ by the bracket bolts 37; while those at the rear side of the vehicle each has its forwardly directed end similarly pivoted end bracketed to the body or side frame and its rear end engaged in a bracket 35 of a rearwardly disposed pneumatic cushion and secured therewith to the rear axle or axle housing $c$ by means of the bracket bolts 37. An outwardly and upwardly curved extension 121' is formed at the outer end of each of the front and rear torque members or arms 121 and is in turn, connected by a transverse member or the like 221 to a bracket 222 depending from the opposite side of the body or side frame $a$.

The centering devices 221 at the front and rear end of the vehicle chassis are each constituted in a pair of flexible members or cables disposed in crossed relation, so that one end of each will connect, by any suitable means to the adjacent end of the extension 121' of the torque members or arms 121 and the other end thereof to a bracket 222 depending from the opposite side of the body or side frames $a$. In lieu of the brackets 222 the complemental of the ends of the centering members or cables 221 may be connected directly to the adjacent sides of the body or side frames $a$. Also the extensions 121' may or may not be integral with the torque members or arms 121, as desired.

To achieve the objects and advantages herein set forth for the invention, it is essential that the proportions of the cushions 21 be accurately determined in accordance with the stated formulæ and that the forms as described be adhered to, so that, with the torque members or arms 121 and body centering devices 221 functioning as previously explained, the cushions have to function only as ideally smooth, frictionless and noiseless supports for all parts of the vehicle that are carried by them, as a consequence whereof comfort is provided for the occupants of the vehicle that is unattainable by any of the other several body suspension means now in use.

It is to be noted that in cars equipped with a torque tube or torque arm the rearwardly disposed of the torque members or arms 121 may be omitted, while in cars of the Ford type both the front and rear torque members or arms 121 may be dispensed with.

It is also to be noted that, in the use of this motor vehicle body suspension system there is a marked reduction of unsprung weight, which is made possible because the combined weight of all parts of this suspension will be appreciably less than the weight of the usual steel springs and their necessary connecting parts. This weight may be further reduced by making the torque members or arms 121 of high-strength steel tubular stock. Again, in the use of the pneumatic forms of suspension means herein provided for, the pressure to which the same are inflated can be readily varied to suit the load carried at the moment by the vehicle, or to suit the condition of the road or ground surface. Also, that it is not expected that the system of pneumatic suspension will satisfactorily function without the use of snubbers or other forms of shock absorbers such as are now employed with steel spring suspensions to check the rebound.

It is to be further noted that the various parts of the invention, or various combinations of the parts thereof which have been set forth herein may be employed as shown, or with such modifications as may be found necessary to replace steel springs or the like in the landing gear of airplane or in any structure, machine or mechanism where their use would be advantageous, in addition to their specific application to motor vehicles.

A modified form of mounting for the pivot connection 122" of each torque arm

121" is contemplated and as shown in Figure 12, the same is constituted in the bracket 123" which has an open center, preferably of rectangular form, to house a cushion of rubber or the like 126 therein, in which the pivot 122" is embedded. By this arrangement the desired noiseless functioning which is characteristic of the entire suspension system is applied to this point. This construction provides an element 126 to act as a shock absorber and provides a pivot that requires no lubrication.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

I claim:

1. A suspension system for motor vehicle bodies and the like, comprising inflatable pneumatic cushions interposed between the body and the front and rear axles of a vehicle, torque arms extending inwardly from the front and rear axles of the vehicle and connecting the body at their inner ends and the said axles at or near the outer ends of the torque arms, and means extending transversely of the vehicle between the outer ends of said torque arms and the body for centering the latter with respect to said cushions.

2. A suspension system for motor vehicle bodies and the like, comprising inflatable pneumatic cushions interposed between the body and the front and rear of a vehicle, torque arms extending inwardly from the front and rear ends of the vehicle and pivotally connecting the body at their inner ends and the said axles fixedly at or near their outer ends, and means extending transversely of the vehicle between the outer ends of said torque arms and the body for centering the latter with respect to said cushions.

3. A suspension system for motor vehicle bodies and the like, comprising inflatable pneumatic cushions interposed between the body and the front and rear axles of a vehicle, torque arms extending inwardly from the front and rear axles of the vehicle and pivotally connecting the body at their inner ends and the said axles fixedly at or near their outer ends, and flexible means extending transversely of the vehicle between the outer ends of said torque arms and the body for centering the latter with respect to said cushions.

4. A suspension system for motor vehicle bodies and the like comprising inflatable pneumatic cushions interposed between the body and the front and rear axles of a vehicle, torque arms extending longitudinally inwardly from the front and rear axles of the vehicle and pivotally connecting the body at their inner ends and the said axles fixedly at or near their outer ends, flexible means extending transversely of the vehicle between the outer ends of said torque arms and the body for centering the latter with respect to said cushions, and means extending forwardly and rearwardly from the outer ends of said torque arms and connecting the chassis of the vehicle.

5. A suspension system for motor vehicle bodies and the like comprising inflatable pneumatic cushions interposed between the body and the front and rear axles of a vehicle, torque arms extending longitudinally inwardly from the front and rear axles of the vehicle and pivotally connecting the body at their inner ends and the said axles fixedly at or near their outer ends, flexible means extending transversely of the vehicle between the outer ends of said torque arms and the body for centering the latter with respect to said cushions, and flexible means extending forwardly and rearwardly from the outer ends of said torque arms and connecting the chassis of the vehicle.

6. A pneumatic suspension device for the bodies of motor vehicles and the like, comprising a flexible casing, an inflatable cushion adapted to be housed within said casing, said casing having a normally concealed opening in one side thereof to allow for the insertion and removal of a cushion into and from the same, and means engageable with the upper and lower sides of said casing for securing the same to and in interposed relation between the body and the axles of the vehicle.

7. A pneumatic suspension device for motor vehicle bodies and the like comprising a flexible casing, an inflatable cushion adapted to be housed within said casing, said casing having an opening in the upper side thereof to allow for the insertion and removal of a cushion into and from the same and brackets carried by the upper and lower sides of said casing and adapted for attachment to the body and axles of the vehicle to sustain the device in interposed relation therebetween, said opening being normally concealed and closed by one of said brackets, and means engageable with the edge of the said opening for securing said casing to the adjacent of said brackets.

8. A pneumatic suspension device for motor vehicle bodies and the like comprising a flexible casing, an inflatable cushion adapted to be housed within said casing, said casing having an opening in the upper side thereof to allow for the insertion and removal of a cushion into and from the same and brackets carried by the upper and lower sides of said casing and adapted for attachment to the body and axles of the vehicle to sustain the device in interposed relation therebetween, the opposed surfaces of said brackets being of a less area than the adjacent sides of said cushion whereby the outer wall of the latter will substantially maintain its normal shape under full deflection of the upper and lower walls thereof.

9. A pneumatic suspension device for motor vehicle bodies and the like comprising a flexible casing, an inflatable cushion adapted to be housed within said casing, said casing having an opening in the upper side thereof to allow for the insertion and removal of a cushion into and from the same and brackets carried by the upper and lower sides of said casing and adapted for attachment to the body and axles of the vehicle to sustain the device in interposed relation therebetween, the opposed surfaces of said brackets being of a less area than the adjacent sides of said cushion and having their outer edges rounded off whereby the outer wall of the cushion will substantially maintain its normal shape under deflection of the upper and lower walls thereof.

10. A pneumatic suspension device for motor vehicle bodies and the like, comprising a flexible casing, an inflatable cushion removably housed within said casing, supporting brackets carried by the frame and axles of the vehicle, detachable fastenings for securing said casing between companion brackets, and an inflation tube projecting from said cushion outwardly of the casing and extending through one of said brackets for inflation purposes.

11. A pneumatic suspension device for motor vehicle bodies and the like, comprising a flexible casing, an inflatable cushion removably housed within said casing, supporting brackets carried by the body and axles of the vehicle, detachable fastenings for securing said casing between companion brackets, means for inflating said cushion in its operative position, said brackets having centrally arranged depressions in their opposed faces, and thickened portions formed on the upper and lower sides of said cushion and adapted to seat in the said depressions whereby to absorb shocks due to heavy jolts and jars to the vehicle and thereby relieve the vehicle from the strains and stresses incident thereto.

12. A pneumatic suspension device for motor vehicle bodies and the like, comprising a flexible casing, an inflatable cushion removably housed within said casing, supporting brackets carried by the frame and axles of the vehicle, detachable fastenings for securing said casing between companion brackets, means for inflating said cushion in its operative position, said brackets having centrally arranged depressions in their opposed faces, and thickened portions formed interiorly and exteriorly of the upper and lower sides of said cushion and adapted to seat in the said depression whereby to absorb shocks due to heavy jolts and jars to the vehicle and thereby relieving the vehicle from the strains and stresses incident thereto.

13. A pneumatic suspension device comprising a flexible casing, an inflatable cushion adapted to be housed within said casing, said casing having a suitable opening through which a cushion may be inserted or removed and brackets attached to the upper and lower sides of said casing and adapted for attachment to the frame or body and axle of the vehicle to sustain the device in interposed relation therebetween, the opposed surfaces of said brackets covering a definite proportion of the adjacent area of said cushion whereby the central part of the upper and lower sides of said cushions meet when fully deflected, leaving a surrounding annular or oblong volume of air whereby the final pressure of air in said cushion is definitely limited.

14. A pneumatic suspension device comprising a flexible casing, an inflatable cushion adapted to be housed within said casing, said casing having a suitable opening through which a cushion may be inserted or removed and brackets attached to the upper and lower sides of said casing and adapted for attachment to the frame or body and axle of the vehicle to sustain the device in interposed relation therebetween, the opposed surfaces of said brackets covering a limited proportion of the adjacent area of said cushions whereby the central part of the upper and lower sides of said cushions meet when fully deflected leaving a surrounding annular or oblong volume of air whereby the final pressure of air in said cushions is definitely limited, the perimetric length of the casing being the same when fully deflected as when in normal position thereby preventing destructive stresses in said casing.

15. A pneumatic suspension device for the bodies of motor vehicles and the like, comprising a flexible casing having openings in the upper and lower sides thereof, an inflattable cushion adapted to be housed within said casing, said cushion being insertible into and removable from said casing at one or the other of the said openings, supporting brackets arranged at the upper and lower sides of said casing, and means engageable with the edges of the said openings for securing the upper and lower sides of said casing to said brackets, said brackets acting to entirely conceal the said openings when in secured assembly with said casing.

MONROE R. HULL.